(12) United States Patent
Choi et al.

(10) Patent No.: US 7,889,696 B2
(45) Date of Patent: Feb. 15, 2011

(54) RETRANSMISSION METHOD AND APPARATUS USING MULTIPLE MOTHER CODES IN A SYSTEM USING HARQ

(75) Inventors: Seung-Hoon Choi, Suwon-si (KR); Jae-Yoel Kim, Suwon-si (KR); Gyu-Bum Kyung, Suwon-si (KR); Hong-Sil Jeong, Seoul (KR); Dong-Seek Park, Yongin-si (KR); Young-Ho Kim, Suwon-si (KR); Kyeong-Cheol Yang, Seoul (KR); Hyeon-Gu Yang, Seoul (KR); Se-Ho Myung, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 11/842,467

(22) Filed: Aug. 21, 2007

(65) Prior Publication Data

US 2008/0043703 A1    Feb. 21, 2008

(30) Foreign Application Priority Data

Aug. 21, 2006   (KR) ...................... 10-2006-0079038

(51) Int. Cl.
*H04W 4/00*   (2009.01)

(52) U.S. Cl. ...................................................... 370/330
(58) Field of Classification Search ....................... None
See application file for complete search history.

(56) References Cited

U.S. PATENT DOCUMENTS

| 6,697,986 | B2 | 2/2004 | Kim et al. | |
|---|---|---|---|---|
| 7,200,181 | B2 * | 4/2007 | Kim et al. .................... | 375/262 |
| 2005/0250497 | A1 * | 11/2005 | Ghosh et al. ................. | 455/436 |
| 2006/0245384 | A1 * | 11/2006 | Talukdar et al. ............. | 370/310 |

FOREIGN PATENT DOCUMENTS

KR   10-2001-0107647 A   12/2001

\* cited by examiner

*Primary Examiner*—Raj K Jain
(74) *Attorney, Agent, or Firm*—Jefferson IP Law, LLP

(57) ABSTRACT

An apparatus and method for retransmitting a codeword packet in a system using Hybrid Automatic Repeat reQuest (HARQ) are provided. The HARQ retransmission method includes defining multiple mother codes, and selecting one of code rates of the mother codes as an initial transmission code rate according to channel condition, determining a retransmission unit for each of codeword packets coded with code rates corresponding to the mother codes and retransmitting corresponding codeword packets in units of the determined retransmission units every time there is a retransmission request.

9 Claims, 7 Drawing Sheets

RETRANSMISSION METHOD AND APPARATUS USING MULTIPLE MOTHER CODES IN A SYSTEM USING HARQ

PRIORITY

This application claims the benefit under 35 U.S.C. §119 (a) of a Korean patent application filed in the Korean Intellectual Property Office on Aug. 21, 2006 and assigned Serial No. 2006-79038, the entire disclosure of which is hereby incorporated by reference.

BACKGROUND OF THE INVENTION

1. Field of the Invention

The present invention relates generally to a communication system. More particularly, the present invention relates to a retransmission method and apparatus using multiple mother codes in a system using Hybrid Automatic Repeat reQuest (HARQ).

2. Description of the Related Art

Error control techniques used in communication systems include a Forward Error Correction (FEC) technique and an Automatic Repeat reQuest (ARQ) technique. The FEC technique is a technique for correcting an error in received information using a code having an error correction capability. It is used when there is no feedback channel available for notifying a transmitting entity of the success or failure of its information transmission. The ARQ technique uses, for example, a Cyclic Redundancy Check (CRC) code having a high error detection capability and sends a request for retransmission to a transmitting entity over a feedback channel upon detecting an error in received information. In the FEC technique, if a receiving entity fails in error correction, defective information may be delivered to the user. If a system having a high reliability level is designed and implemented to address this problem, a great number of powerful codes capable of correcting errors must be used. However, this increases the complexity of the decoding process and makes it difficult to achieve the implementation. The ARQ technique, though it has a simple structure and a high reliability, may suffer from an abrupt decrease in information throughput in response to an increase in a channel error rate.

A Hybrid Automatic Repeat reQuest (HARQ) technique has been proposed to make up for the foregoing drawbacks by appropriately combining the ARQ technique with the FEC technique.

The HARQ technique is classified into Type-I, Type-II and Type-III. The Type-I HARQ system, the simplest hybrid structure, encodes a transmission information word for error detection and error correction. The Type-I HARQ system can be divided into a type in which one code performs both error detection and error correction, and a type in which two different codes perform error detection and error correction respectively. The Type-I HARQ system may suffer from an abrupt decrease in the information throughput in response to an increase in the channel error rate. Also, the Type-I HARQ system may suffer from overhead because the system must transmit a predetermined number of parity bits for error correction regardless of the channel condition when it uses one error correction code. The Type-II HARQ system, upon detecting an error, combines the defective packet after retransmitting only a supplementary parity without discarding the defective packet to increase decoding efficiency, thereby solving the defects. The Type-III HARQ system, like the Type-II HARQ system, upon receiving the retransmitted supplementary parities, combines the received supplementary parities with the defective packet, thereby increasing decoding efficiency. Generally, in the Type-II HARQ system, retransmission packets include only the supplementary parity, and when there is a retransmission request, the Type-II HARQ system sequentially sends the supplementary packets that it has not sent yet, and then combines the previously received packets for decoding.

A detailed description will now be made of an HARQ operation in the Type-II HARQ system.

A device in charge of Type-II HARQ transmission/reception will be referred to herein as an HARQ entity. A transmitting HARQ entity takes charge of transmission and retransmission of HARQ packets, and a receiving HARQ entity takes charge of combining/soft-combining of retransmitted HARQ packets and transmission of Acknowledgement (ACK)/Negative Acknowledgement (NACK) signals.

The HARQ entity is composed of multiple HARQ processors. A HARQ processor is a unit device in charge of transmission/reception of user packets. A transmitting HARQ processor takes charge of transmission and retransmission of user packets, and a receiving HARQ processor takes charge of combining/soft-combining of user packets.

The HARQ processors exist in pairs in a transmitting entity and a receiving entity, and one HARQ entity includes multiple HARQ processors, thereby enabling continuous transmission/reception. Specifically, the HARQ processor includes operations of transmitting a user packet, receiving ACK/NACK information therefor, and performing retransmission. That is, if there is only one HARQ processor, the HARQ processor cannot transmit other packets until it transmits user data and receives ACK/NACK information therefor. However, if there are several HARQ processors, while one HARQ processor waits for ACK/NACK, other HARQ processors can transmit data. Therefore, the HARQ entity can enable continuous transmission/reception by including multiple HARQ processors.

A basic operation of the HARQ processor is as follows.

A transmitting HARQ processor channel-codes/transmits user data and then stores the channel-coded data in a buffer for future retransmission. Thereafter, upon receipt of ACK information for the stored data, the transmitting HARQ processor flushes the data, and upon receipt of NACK information for the data, the transmitting HARQ processor retransmits the data according to a retransmission protocol. A detailed description of the retransmission protocol will be made with reference to FIGS. 1A and 1B.

A receiving HARQ processor channel-decodes data received over a physical channel and determines occurrence/non-occurrence of an error through a CRC code check. If an error has occurred, the receiving HARQ processor stores the data in a buffer, and sends a NACK signal. Thereafter, upon receipt of retransmission data for the data, the receiving HARQ processor combines/soft-combines the data stored in the buffer with the retransmission data in order, performs channel decoding thereon, and then determines again occurrence/non-occurrence of an error. If it is determined that there is still error, the receiving HARQ processor sends a NACK signal and repeats the above process. However, if it is determined that the error has been solved, the receiving HARQ processor sends an ACK signal.

As described above, the HARQ operation combines/soft-combines defective data with its retransmission data without discarding the defective data, and performs channel decoding thereon, thereby reducing a BLock Error Rate (BLER) for the packet.

With reference to FIGS. 1A and 1B, a detailed description will now be made of the retransmission protocol.

FIG. 1A is a diagram illustrating a conventional codeword packet in a Type-II HARQ system.

Referring to FIG. 1A, for a retransmission protocol, the Type-II HARQ system divides a codeword coded with a mother code in units of a particular length, for example, 200 symbols. It is assumed herein that a code rate of a mother code for channel coding is 1/5, and the mother code has a systematic structure. The total length of a codeword coded with the mother code is a 1000-symbol length, of which a length of an information word is a 200-symbol length 100 and a length of parities is an 800-symbol length including 200-symbol lengths 102, 104, 106 and 108.

For the Type-II HARQ retransmission, the Type-II HARQ system divides the codeword into 5 length-200 packets (i.e. packets with a 200-symbol length) 100 to 108.

FIG. 1B is a diagram illustrating a conventional retransmission procedure in a Type-II HARQ system.

Referring to FIG. 1B, in step 110 for initial transmission, an HARQ processor transmits a first packet 100. Thereafter, upon receipt of ACK in step 114, the HARQ processor ends the procedure. Alternatively, upon receipt of NACK in step 112, the HARQ processor proceeds to step 116.

In step 116, the HARQ processor transmits a second packet 102, or the next packet of the first packet 100, in the codeword coded according to a code rate of a mother code. Thereafter, upon receipt of ACK in step 120, the HARQ processor ends the procedure, and upon receipt of NACK in step 118, the HARQ processor proceeds to step 122.

In step 122, the HARQ processor transmits a third packet 104, or the next packet of the second packet 102. Thereafter, upon receipt of ACK in step 126, the HARQ processor ends the procedure, and upon receipt of NACK in step 124, the HARQ processor proceeds to step 128.

In step 128, the HARQ processor transmits a fourth packet 106, or the next packet of the third packet 104. Thereafter, upon receipt of ACK in step 132, the HARQ processor ends the procedure, and upon receipt of NACK in step 130, the HARQ processor proceeds to step 134.

In step 134, the HARQ processor transmits the last packet 108 in the codeword. Thereafter, upon receipt of ACK in step 140, the HARQ processor ends the procedure, and upon receipt of NACK in step 136, the HARQ processor returns to step 110 and repeats the above procedure because there is no more new transmission packet in the codeword. If the HARQ processor fails to receive ACK and receives NACK even after the number of transmissions for the packet has reached the maximum number of transmissions, the HARQ processor performs no more packet transmission. The 'maximum number of transmissions' is defined herein as the number of transmissions including initial transmission and retransmissions, and if the maximum number of transmissions is assumed to be 5, the HARQ processor ends the procedure after step 136.

When the HARQ processor performs Type-II HARQ retransmission using one mother code as described in FIGS. 1A and 1B, an effective code rate during initial transmission of the information word 100 is 1 and an effective code rate during retransmission of the second packet 102 is 1/2. An effective code rate during retransmission of the third packet 104 is 1/3, an effective code rate during retransmission of the fourth packet 106 is 1/4, and an effective code rate during retransmission of the last packet 108 is 1/5. The 'effective code rate' is defined herein as a ratio of a length of a desired transmission information word to a sum of lengths of the already transmitted HARQ packets.

That is, to increase performance of the Type-II HARQ system, the HARQ processor should optimize the code rates such as 1/2, 1/3, 1/4 and 1/5 according to the corresponding effective code rates. For example, a Low Density Parity Check (LDPC) code can obtain an optimized code through density evolution. To make a code satisfying the code rates, the LDPC code can use puncturing and extending. The puncturing is a method of puncturing a part of parity, starting with the 1/5 code as a mother code, thereby making 1/4, 1/3 and 1/2 codes. The extending is a method of adding independent parity-check equations and new parity bits, starting with a 1/2 code as a mother code, thereby making 1/3, 1/4 and 1/5 codes. The 'optimization' in the optimized code herein means that performance of the codes made through puncturing or extending approaches performance of the codes originally made to aim at the corresponding code rate.

However, it is very difficult to obtain performance-optimized codes satisfying effective code rates using one mother code as described above.

SUMMARY OF THE INVENTION

An aspect of the present invention is to address at least the above mentioned problems and/or disadvantages and to provide at least the advantages described below. Accordingly, an aspect of the present invention is to provide a retransmission method and apparatus using multiple mother codes in a system using HARQ.

According to one aspect of the present invention, a Hybrid Automatic Repeat reQuest (HARQ) retransmission method in a communication system is provided. The HARQ retransmission method includes defining multiple mother codes, selecting one of code rates of the mother codes as an initial transmission code rate according to channel condition, determining a retransmission unit for each of codeword packets coded with code rates corresponding to the mother codes and retransmitting corresponding codeword packets in units of the determined retransmission units every time there is a retransmission request.

According to another aspect of the present invention, a Hybrid Automatic Repeat reQuest (HARQ) retransmission apparatus in a communication system is provided. The HARQ retransmission apparatus includes a controller for defining multiple mother codes, for selecting one of code rates of the mother codes as an initial transmission code rate according to channel condition, for determining a retransmission unit for each of codeword packets coded with code rates corresponding to the mother codes and for retransmitting corresponding codeword packets in units of the determined retransmission units every time there is a retransmission request.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions, constructions and configurations are omitted for clarity and conciseness.

The present invention provides an apparatus and method for including more than one mother code, selecting an appropriate code rate during initial transmission, and supporting an effective code rate obtainable through the mother code in a system using HARQ. The details will be described with reference to exemplary embodiments.

Figure 1A:
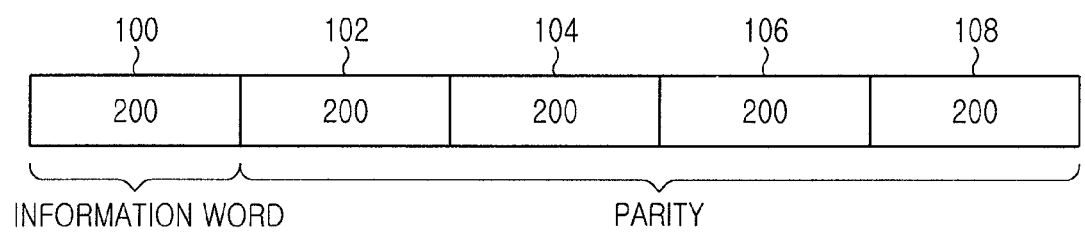
FIG. 1A is a diagram illustrating a conventional codeword packet in a Type-II HARQ system.
Figure 1B:
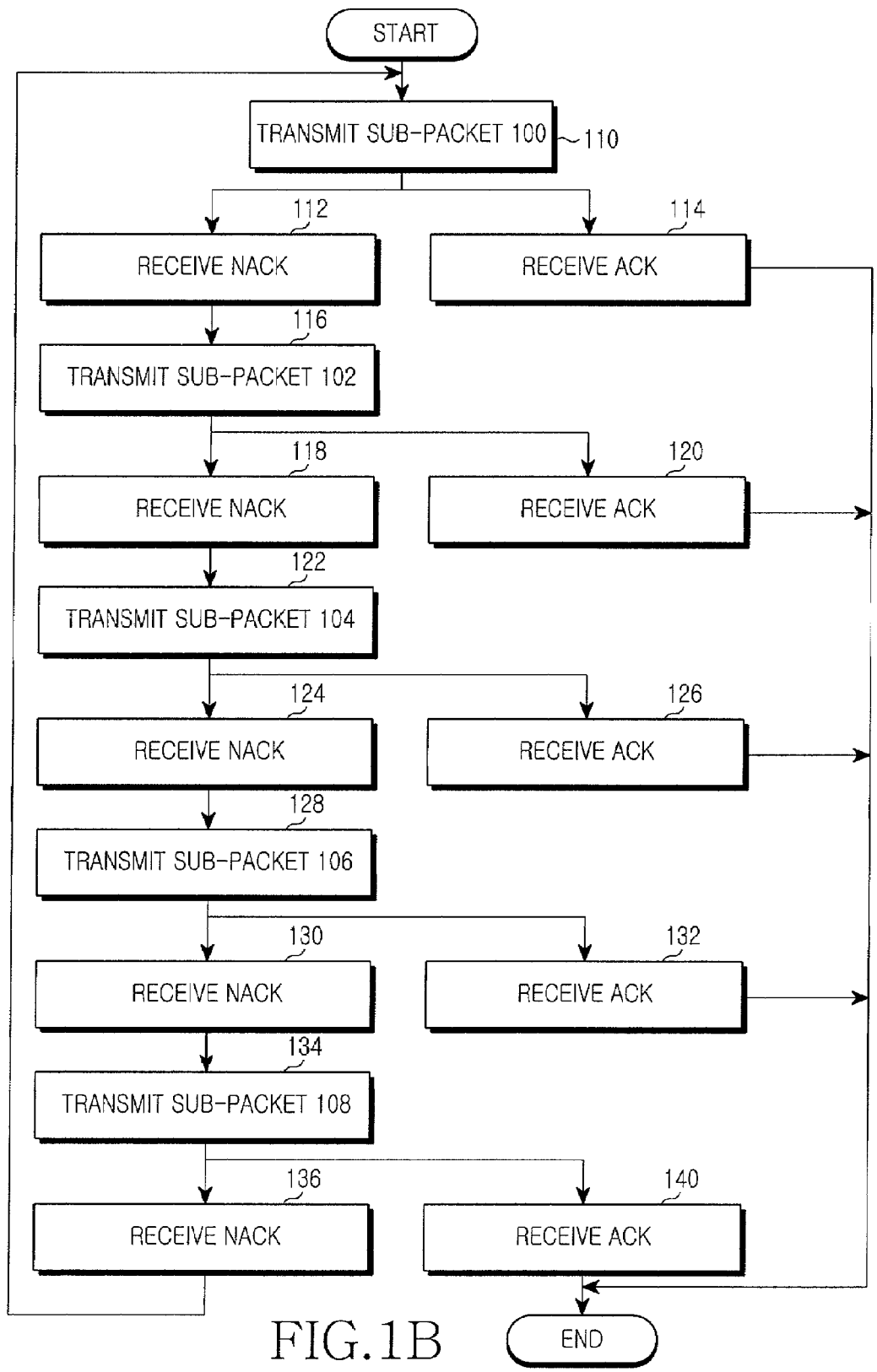
FIG. 1B is a diagram illustrating a conventional retransmission procedure in a Type-II HARQ system.
Figure 2A:
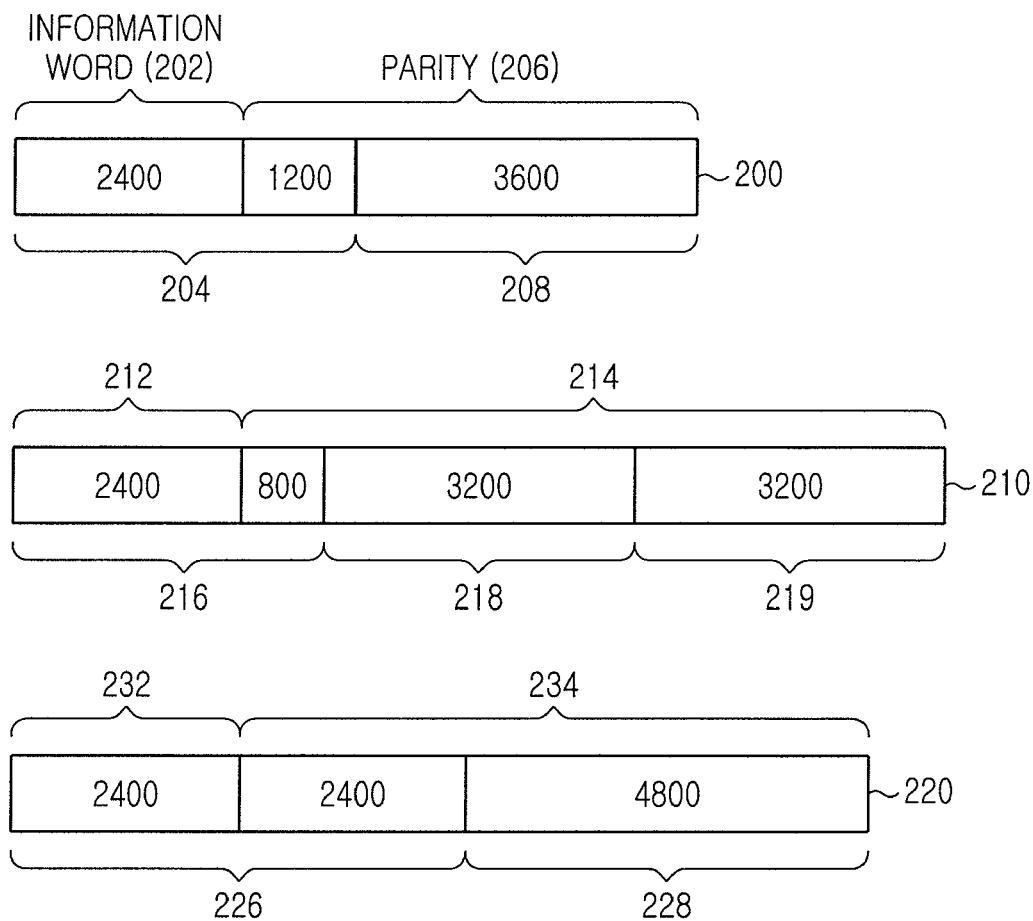
FIG. 2A is a diagram illustrating codeword packets according to an exemplary embodiment of the present invention.

FIG. 2A is a diagram illustrating codeword packets according to an exemplary embodiment of the present invention. Codeword packets 200, 210 and 220 initially include input information words, all of which have an equal size of 2400, are encoded with code rates of multiple mother codes in the Type-II HARQ system, and are then divided into sub-packets with a particular length according to an initial transmission code rate selected as one of code rates of the mother codes.

Referring to FIG. 2A, for the codeword packet #1 200, a code rate of a mother code for channel coding is 1/3, and an initial transmission code rate is defined as 2/3. The mother code is assumed to have a systematic structure. The total length of the codeword packet #1 200 coded with the code rate of 1/3 is a 7200-symbol length, of which a length of an information word 202 is a 2400-symbol length and a length of parities 206 is a 4800-symbol length. Because the initial transmission code rate for Type-II HARQ retransmission is 2/3, the codeword packet #1 200 is divided into a sub-packet #1 204 and a sub-packet #2 208, both of which have a 3600-symbol length.

For the codeword packet #2 210, a code rate of a mother code is 1/4, and an initial transmission code rate is defined as 3/4. The mother code is assumed to have a systematic structure. The total length of the codeword packet #2 210 coded with the code rate of 1/4 is a 9600-symbol length, of which a length of an information word 212 is a 2400-symbol length and a length of parities 214 is a 7200-symbol length. Because the initial transmission code rate for Type-II HARQ retransmission is 3/4, the codeword packet #2 210 is divided into a sub-packet #1 216, a sub-packet #2 218 and a sub-packet #3 219, all of which have a 3200-symbol length.

For the codeword packet #3 220, a code rate of a mother code is 1/4, and an initial transmission code rate is defined as 1/2. The mother code is assumed to have a systematic structure. The total length of the codeword packet #3 220 coded with the code rate of 1/4 is a 9600-symbol length, of which a length of an information word 232 is a 2400-symbol length and a length of parities 234 is a 7200-symbol length. Because the initial transmission code rate for Type-II HARQ retransmission is 1/2, the codeword packet #3 220 divided into a sub-packet #1 226 and a sub-packet #2 228, both of which have a 4800-symbol length.

Figure 2B:
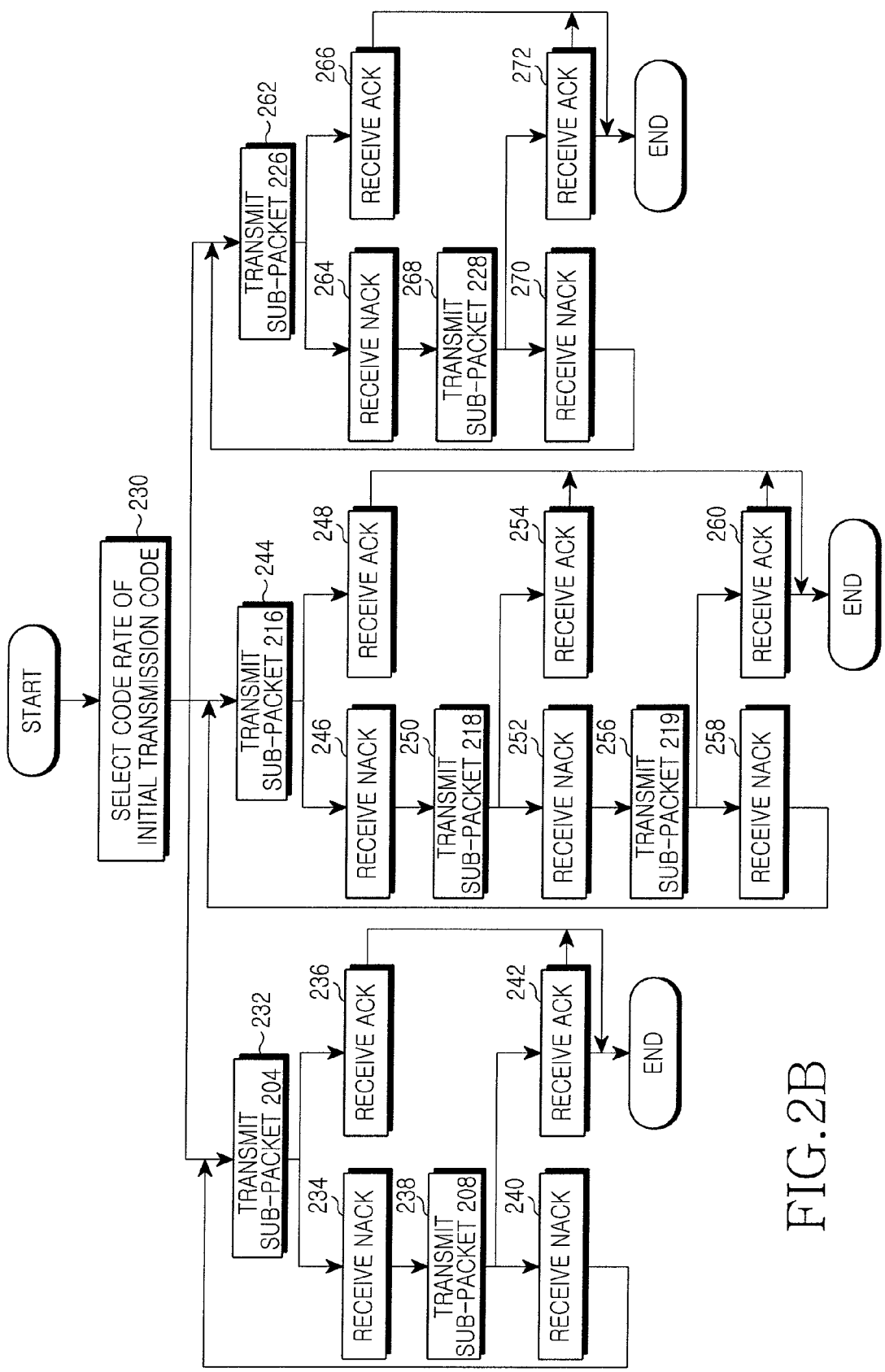
FIG. 2B is a diagram illustrating a retransmission procedure according to an exemplary embodiment of the present invention.

FIG. 2B is a diagram illustrating a retransmission procedure according to an exemplary embodiment of the present invention.

Referring to FIG. 2B, in step 230, an HARQ processor selects a code rate for an intended initial transmission code according to, for example, a channel condition. The HARQ processor can select one of code rates 2/3, 3/4 and 1/2 as an initial transmission code rate wherein a length of a transmission packet is variable at 3600 (for 204), 3200 (for 216) and 4800 (for 226) according to the selected code rate.

When the HARQ processor selects a code rate 2/3 for the intended initial transmission code, the HARQ processor sets to transmit a sub-packet #1 204 including an information word 202 in step 232 for initial transmission. Thereafter, upon receipt of ACK in step 236, the HARQ processor ends the procedure, and upon receipt of NACK in step 234, the HARQ processor proceeds to step 238.

In step 238, the HARQ processor transmits a sub-packet #2 208. Thereafter, upon receipt of ACK in step 242, the HARQ processor ends the procedure, and upon receipt of NACK in step 240, the HARQ processor returns to step 232.

If the HARQ processor fails to receive ACK and receives NACK even after the number of transmissions for the packet has reached the maximum number of transmissions, the HARQ processor stops the packet transmission and reselects an initial transmission code rate according to a channel condition at the stop time. Thereafter, the HARQ processor sequentially retransmits sub-packets of a codeword packet #1 200, divided according to the selected initial transmission code rate, one by one.

When the HARQ processor selects a code rate 3/4 for the intended initial transmission code, the HARQ processor sets to transmit a sub-packet #1 216 including an information word 212 in step 244 for initial transmission. Thereafter, upon receipt of ACK in step 248, the HARQ processor ends the procedure, and upon receipt of NACK in step 246, the HARQ processor proceeds to step 250.

In step 250, the HARQ processor transmits a sub-packet #2 218. Thereafter, upon receipt of ACK in step 254, the HARQ processor ends the procedure, and upon receipt of NACK in step 252, the HARQ processor proceeds to step 256.

In step 256, the HARQ processor transmits a sub-packet #3 219. Thereafter, upon receipt of ACK in step 260, the HARQ processor ends the procedure, and upon receipt of NACK in step 258, the HARQ processor returns to step 244. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor sequentially retransmits sub-packets of a codeword packet #2 210, divided according to the selected initial transmission code rate, one by one.

When the HARQ processor selects a code rate 1/2 for the intended initial transmission code, the HARQ processor sets to transmit a sub-packet #1 226 including an information word 232 in step 262 for initial transmission. Thereafter, upon receipt of ACK in step 266, the HARQ processor ends the procedure, and upon receipt of NACK in step 264, the HARQ processor proceeds to step 268.

In step 268, the HARQ processor transmits a sub-packet #2 228. Thereafter, upon receipt of ACK in step 272, the HARQ processor ends the procedure, and upon receipt of NACK in step 270, the HARQ processor returns to step 262. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor sequentially retransmits sub-packets of a codeword packet #3 220 one by one, divided according to a code rate of a mother code corresponding to the selected initial transmission code rate.

As described above, in an exemplary embodiment of the present invention, for the packets coded with code rates of multiple mother codes, the HARQ processor first selects a corresponding initial transmission code rate as one of code rates of the multiple mother codes taking, for example, channel condition, into account. Thereafter, the HARQ processor transmits a first sub-packet including an information word during initial transmission among the sub-packets divided according to the initial transmission code rate of the corresponding codeword packet, and transmits the next sub-packet every time there is a retransmission request. If the HARQ processor fails to receive ACK and receives NACK even after the number of transmissions for the packet has reached the maximum number of transmissions, the HARQ processor stops the packet transmission, and reselects an initial transmission code rate according to channel condition at the stop time. Thereafter, the HARQ processor divides again the codeword packet into sub-packets according to the selected initial transmission code rate, and sequentially retransmits divided sub-packets one by one. The Type-II HARQ system performs retransmission using the retransmission scheme of FIGS. 2A and 2B.

In another exemplary embodiment of the present invention, the Type-II HARQ system includes multiple mother codes and for codeword packets coded according to code rates of the multiple mother codes, their information words are different in size. However, a length of every packet transmitted for the Type-II HARQ retransmission is constant.

Figure 3A:
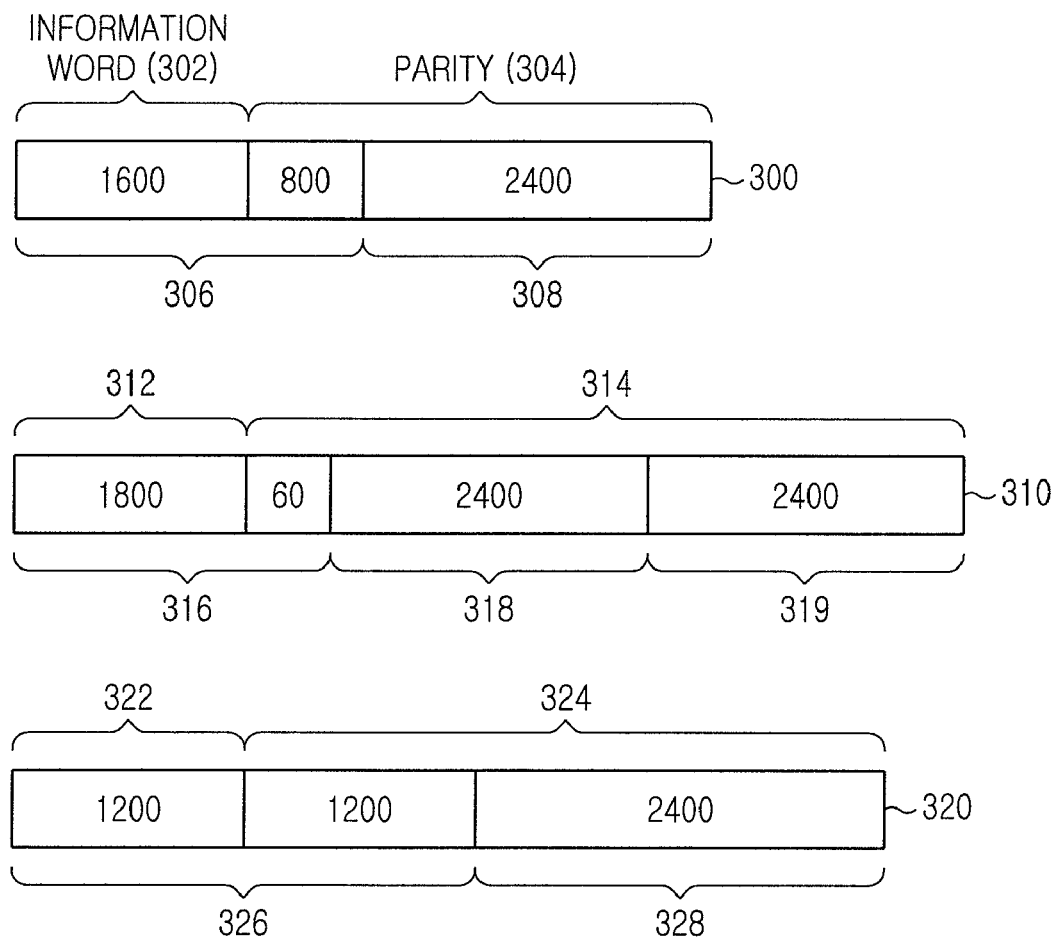
FIG. 3A is a diagram illustrating codeword packets according to an exemplary embodiment of the present invention.

FIG. 3A is a diagram illustrating coded packets according to an exemplary embodiment of the present invention. Codeword packets 300, 310 and 320 are coded with code rates of different mother codes and sizes of their sub-packets for retransmission have been predetermined. That is, although their initial transmission information words are different in size to 1600, 1800 and 1200, respectively, they are divided into sub-packets having the same length, for example, 2400 symbols, as their Type-II HARQ retransmission units.

Referring to FIG. 3A, for the codeword packet #1 300, a code rate of a mother code for channel coding is 1/3, and an initial transmission code rate is defined as 2/3. The mother code is assumed to have a systematic structure. The total length of the codeword packet coded with the code rate of 1/3 is a 4800-symbol length, of which a length of an information word 302 is a 1600-symbol length and a length of parities 304 is a 3200-symbol length. For the Type-II HARQ retransmission, the codeword packet #1 300 is divided into two sub-packets 306 and 308, both of which have a 2400-symbol length.

For the codeword packet #2 310, a code rate of a mother code for channel coding is 1/4, and an initial transmission code rate is defined as 3/4. The mother code is assumed to have a systematic structure. The total length of the codeword packet coded with the code rate of 1/4 is a 7200-symbol length, of which a length of an information word 312 is an 1800-symbol length and a length of parities 314 is a 5400-symbol length. For the Type-II HARQ retransmission, the codeword packet #2 310 is divided into 3 sub-packets 316, 318 and 319, all of which have a 2400-symbol length.

For the codeword packet #3 320, a code rate of a mother code for channel coding is 1/4, and an initial transmission code rate is defined as 1/2. The mother code is assumed to have a systematic structure. The total length of the codeword packet coded with the code rate of 1/4 is a 4800-symbol length, of which a length of information word 322 is a 1200-symbol length and a length of parities 324 is a 3600-symbol length. For the Type-II HARQ retransmission, the codeword packet #3 320 is divided into two sub-packets 326 and 328, both of which has a 2400-symbol length.

Figure 3B:
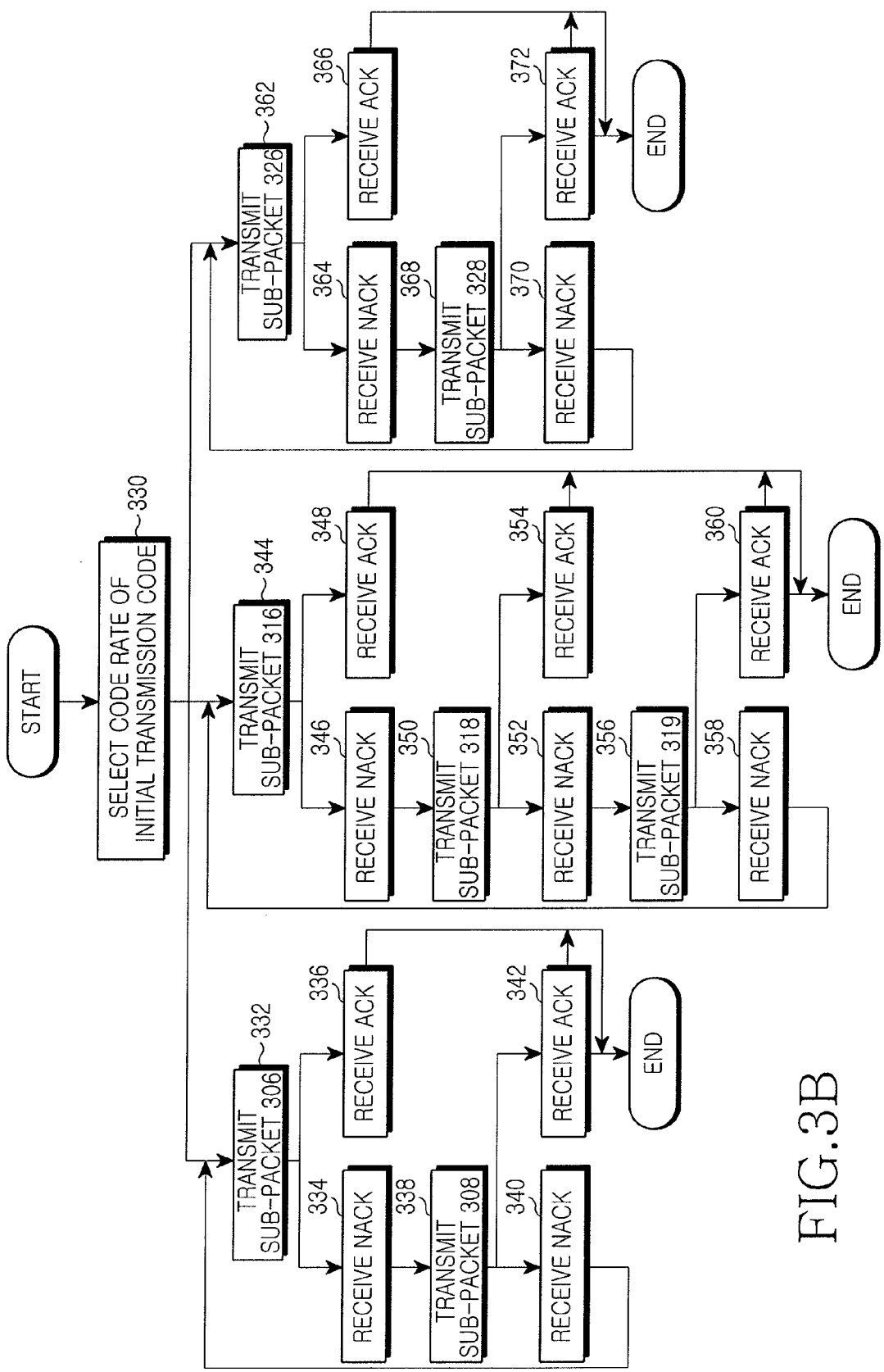
FIG. 3B is a diagram illustrating a retransmission procedure according to an exemplary embodiment of the present invention.

FIG. 3B is a diagram illustrating a retransmission procedure according to an exemplary embodiment of the present invention.

Referring to FIG. 3B, in step 330, an HARQ processor selects a mother code of a transmission code according to, for example, a channel condition. The HARQ processor herein can select one of code rates 2/3, 3/4 and 1/2, and a retransmission unit length of a transmission packet is constant to a 2400-symbol length regardless of the selected code rate. When the HARQ processor selects a code rate 2/3 as the initial transmission code rate, the HARQ processor divides a codeword packet #1 300 coded with the code rate 2/3 into sub-packets, or retransmission units, and then transmits a sub-packet #1 306 including an information word 302 in step 332 for initial transmission. Thereafter, upon receipt of ACK in step 336, the HARQ processor ends the procedure, and upon receipt of NACK in step 334, the HARQ processor proceeds to step 338.

In step 338, the HARQ processor transmits a sub-packet #2 308 in the codeword packet #1 300. Thereafter, upon receipt of ACK in step 342, the HARQ processor ends the procedure, and upon receipt of NACK in step 340, the HARQ processor returns to step 332. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor divides the codeword packet #1 300 into sub-packets corresponding to the reselected initial transmission code rate, and sequentially retransmits the divided sub-packets one by one every time there is a retransmission request.

When the HARQ processor selects a code rate 3/4 as the initial transmission code rate, the HARQ processor divides a codeword packet #2 310 coded with the code rate 3/4 into sub-packets, or retransmission units, and then transmits a sub-packet #1 316 including an information word 312 in step 344 for initial transmission. Thereafter, upon receipt of ACK in step 348, the HARQ processor ends the procedure, and upon receipt of NACK in step 346, the HARQ processor proceeds to step 350.

In step 350, the HARQ processor transmits a sub-packet #2 318 in the codeword packet #2 310. Thereafter, upon receipt of ACK in step 354, the HARQ processor ends the procedure, and upon receipt of NACK in step 352, the HARQ processor proceeds to step 356.

In step 356, the HARQ processor transmits a sub-packet #3 319 in the codeword packet #2 310. Thereafter, upon receipt of ACK in step 360, the HARQ processor ends the procedure, and upon receipt of NACK in step 358, the HARQ processor returns to step 344. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor divides the codeword packet #2 310 into sub-packets corresponding to the reselected initial transmission code rate, and sequentially retransmits the divided sub-packets one by one every time there is a retransmission request.

When the HARQ processor selects a code rate 1/2 as the initial transmission code rate, the HARQ processor divides a codeword packet #3 320 coded with the code rate 1/2 into sub-packets, or retransmission units, and then transmits a sub-packet #1 326 including an information word 322 in step 362 for initial transmission. Thereafter, upon receipt of ACK in step 366, the HARQ processor ends the procedure, and upon receipt of NACK in step 364, the HARQ processor proceeds to step 368.

In step 368, the HARQ processor transmits a sub-packet #2 328 in the codeword packet #3 320. Thereafter, upon receipt of ACK in step 372, the HARQ processor ends the procedure, and upon receipt of NACK in step 370, the HARQ processor returns to step 362. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor divides the codeword packet #3 320 into sub-packets corresponding to the reselected initial transmission code rate, and sequentially retransmits the divided sub-packets one by one every time there is a retransmission request.

As described above, in an exemplary embodiment of the present invention, the HARQ processor first selects an initial transmission code rate as one of code rates of multiple mother codes according to, for example, a channel condition, divides codeword packets coded with the selected initial transmission code rate into sub-packets or predetermined retransmission units, transmits a first sub-packet including an information word in units of the sub-packets during initial transmission, and transmits the next sub-packet every time there is a retransmission request. If the HARQ processor fails to receive ACK and receives NACK even after the number of transmissions for the packet has reached the maximum number of transmissions, the HARQ processor stops the packet transmission, and reselects an initial transmission code rate according to a channel condition at the stop time. Thereafter, the HARQ processor divides the codeword packet into sub-packets corresponding to the reselected initial transmission code rate, and sequentially retransmits the divided sub-packets one by one every time there is a retransmission request. The Type-II HARQ system performs retransmission using the retransmission scheme of FIGS. 3A and 3B. Here, although the information words are different in size, the sub-packets transmitted during every transmission are equal.

Figure 4:
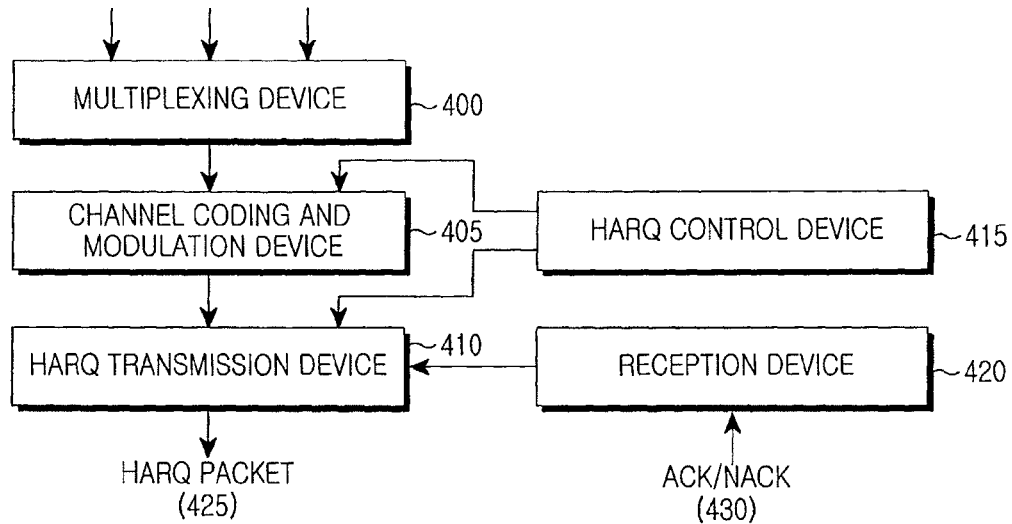
FIG. 4 is a diagram illustrating a structure of a transmitter according to an exemplary embodiment of the present invention.

FIG. 4 is a diagram illustrating a structure of a transmitter according to an exemplary embodiment of the present invention.

Referring to FIG. 4, the transmitter includes a multiplexing device 400, a channel coding and modulation device 405, an HARQ transmission device 410, an HARQ control device 415 and a reception device 420.

The multiplexing device 400 inserts multiplexing information in a packet received from an upper layer, and delivers the resulting packet to the channel coding and modulation device 405. The channel coding and modulation device 405 channel-codes and modulates the packet received from the multiplexing device 400 according to an initial transmission code rate determined by the HARQ control device 415, and delivers the resulting packet to the HARQ transmission device 410.

The HARQ transmission device 410 divides an HARQ packet 425 into sub-packets according to the initial transmission code rate selected by the HARQ control device 415, and transmits the sub-packets. The HARQ transmission device 410 determines retransmission/discarding of the HARQ packet according to a feedback signal.

The HARQ control device 415 selects a retransmission scheme determined according to an exemplary method proposed by the present invention, selects an initial transmission code rate of a corresponding packet according to a channel condition, divides a codeword packet into sub-packets so as to be associated with the selected initial transmission code rate according to an exemplary embodiment of the present invention, and provides information on the divided sub-packets to the HARQ transmission device 410.

Specifically, in an exemplary embodiment of the present invention, the HARQ control device 415 divides the codeword packet into sub-packets according to an initial transmission code rate and transmits the sub-packets, if the initial input information words are equal in size. In another exemplary embodiment of the present invention, the HARQ control device 415 divides the codeword packet into sub-packets having the same size and transmits the sub-packet, if the initial input information words are different in size.

The reception device 420 receives an ACK/NACK signal 430 from a receiving entity, and delivers it to the HARQ transmission device 410. The HARQ transmission device 410 performs the procedures of FIGS. 2B and 3B according to the received ACK/NACK signal.

Figure 5:
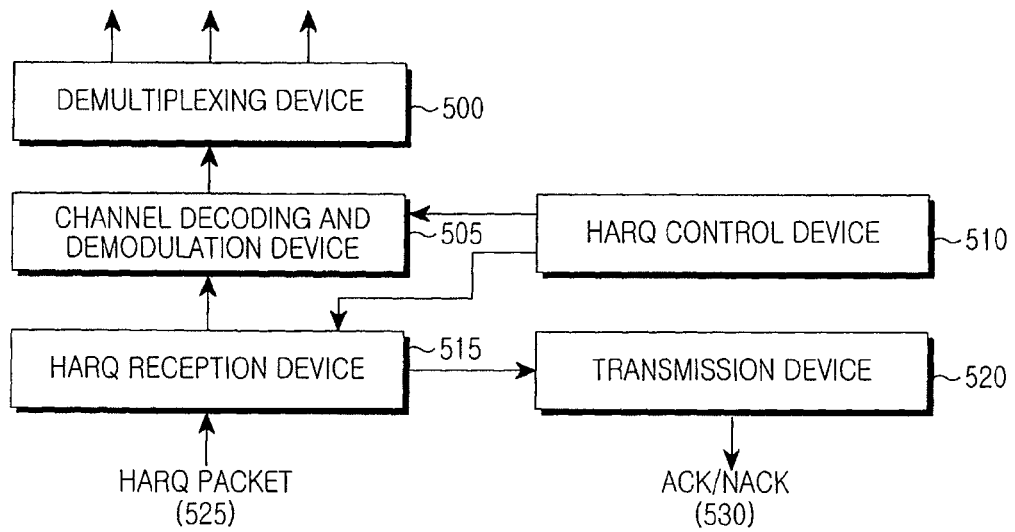
FIG. 5 is a diagram illustrating a structure of a receiver according to an exemplary embodiment of the present invention.

FIG. 5 is a diagram illustrating a structure of a receiver according to an exemplary embodiment of the present invention.

Referring to FIG. 5, the receiver includes a demultiplexing device 500, a channel-decoding and demodulation device 505, an HARQ control device 510, an HARQ reception device 515, and a transmission device 520.

The HARQ reception device 515, under the control of the HARQ control device 510, processes an HARQ packet 525 in transmission order at the transmitter.

The HARQ control device 510 selects an initial transmission code rate based on an exemplary embodiment of the present invention, sets a retransmission scheme based on a mother code corresponding to the initial transmission code rate, and allows the HARQ reception device 515 to process the HARQ packet in units of the divided sub-packets every time there is a retransmission request for the HARQ packet 525.

Specifically, in an exemplary embodiment of the present invention, the HARQ control device 510 divides each of codeword packets including same-sized information words into sub-packets according to an initial transmission code rate selected depending on channel condition, and sequentially sets retransmission orders of the sub-packets. In another exemplary embodiment of the present invention, the HARQ control device 510 divides each of codeword packets having different-sized information words into sub-packets having the same size and sequentially sets retransmission orders of the sub-packets.

The HARQ reception device 515 provides information on the processing result of the HARQ packet 525 to the transmission device 520 so that the transmission device 520 can transmit a feedback signal. As a result, the transmission device 520 transmits an ACK/NACK signal 530 according to the processing result on the HARQ packet 525.

The channel-decoding and demodulation device 505 performs demodulation in reverse to the modulation performed in the transmission device 520, and decodes the HARQ packet 525 according to the initial transmission code rate selected by the transmission device 520 under the control of the HARQ control device 510.

The demultiplexing device 500 delivers the decoded packet to an upper layer using multiplexing information of the received packet.

As is apparent from the foregoing description, according to exemplary embodiments of the present invention, the HARQ processor includes multiple mother codes, selects an appropriate one of code rates of the mother codes during initial transmission, sets a retransmission unit for the corresponding codeword packet according to the selected code rate, and transmits the corresponding packet in units of the retransmission units every time there is a retransmission request. As a result, if it is difficult to have one mother code optimized for all code rates supported by HARQ, the HARQ processor can optimize performance of multiple mother codes according to each initial transmission code rate and optimize the performance only for the effective code rates supported by each mother code, thereby improving the performance compared to the prior art, and thus contributing to a reduction in the number of retransmissions for the packet.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Hybrid Automatic Repeat reQuest (HARQ) retransmission method in a communication system, the method comprising:
    defining, by a controller, multiple mother codes;
    selecting one of code rates of the mother codes as an initial transmission code rate;
    determining, by the controller, a retransmission unit for each of codeword packets coded with code rates corresponding to the mother codes; and
    retransmitting, by the controller, corresponding codeword packets in units of the determined retransmission units in response to a retransmission request
    wherein the determining of the retransmission unit comprises if information word symbols of the codeword packets are equal in size, dividing each of the codeword packets into sub-packets coded with an initial transmission code rate selected for each individual codeword packet, and determining each of the divided sub-packets as a retransmission unit of the corresponding codeword packet,
    wherein the retransmitting of the corresponding codeword packets comprises upon failure to receive an acknowledgement signal (ACK) after a number of transmissions for the sub-packet has reached a maximum number of transmissions, stopping the retransmission and reselecting one of code rates of the mother codes as an initial transmission code rate according to a channel condition at the stop time, dividing each of the codeword packets into sub-packets coded with the reselected initial transmission code rate, and sequentially retransmitting the divided sub-packets one by one in response to a retransmission request.

2. The HARQ retransmission method of claim 1, wherein the selecting of the one of the code rates comprises selecting the one of the code rates according to a channel condition.

3. The HARQ retransmission method of claim 2, wherein each of the codeword packets comprises an information word symbol and a parity symbol.

4. The HARQ retransmission method of claim 1, wherein the determining of the retransmission unit comprises:
    if information word symbols of the codeword packets are different in size, dividing each of the codeword packets into sub-packets having a predetermined size; and
    determining each of the divided sub-packets as a retransmission unit of the corresponding codeword packet.

5. The HARQ retransmission method of claim 4, wherein the retransmitting of the corresponding codeword packets comprises:
    upon failure to receive an ACK after a number of transmissions for the sub-packet has reached a maximum number of transmissions, stopping the retransmission and reselecting one of code rates of the mother codes as an initial transmission code rate according to channel condition at the stop time;
    dividing each of the codeword packets into sub-packets coded with the reselected initial transmission code rate; and
    sequentially retransmitting the divided sub-packets one by one every time there is a retransmission request.

6. A Hybrid Automatic Repeat reQuest (HARQ) retransmission apparatus in a communication system, the apparatus comprising:
    a controller for defining multiple mother codes, for selecting one of code rates of the mother codes as an initial transmission code rate according to a channel condition, for determining a retransmission unit for each of codeword packets coded with code rates corresponding to the mother codes and for retransmitting corresponding codeword packets in units of the determined retransmission units in response to a retransmission request,
    wherein upon failure to receive an acknowledgement signal (ACK) after a number of transmissions for the sub-packet has reached a maximum number of transmissions, the controller stops the retransmission, reselects one of code rates of the mother codes as an initial transmission code rate according to channel condition at the stop time, divides each of the codeword packets into sub-packets coded with the reselected initial transmission code rate, and sequentially retransmits the divided sub-packets one by one every time there is a retransmission request,
    wherein if information word symbols of the codeword packets are different in size, the controller divides each of the codeword packets into sub-packets having a predetermined size and determines each of the divided sub-packets as a retransmission unit of the corresponding codeword packet.

7. The HARQ retransmission apparatus of claim 6, wherein the codeword packet comprises an information word symbol and a parity symbol.

8. The HARQ retransmission apparatus of claim 7, wherein if information word symbols of the codeword packets are equal in size, the controller divides each of the codeword packets into sub-packets coded with an initial transmission code rate selected for each individual codeword packet and determines each of the divided sub-packets as a retransmission unit of the corresponding codeword packet.

9. The HARQ retransmission apparatus of claim 6, wherein upon failure to receive an ACK after a number of transmissions for the sub-packet has reached a maximum number of transmissions, the controller stops the retransmission, reselects one of code rates of the mother codes as an initial transmission code rate according to channel condition at the stop time, divides each of the codeword packets into sub-packets coded with the reselected initial transmission code rate, and sequentially retransmits the divided sub-packets one by one every time there is a retransmission request.

* * * * *